United States Patent [19]

Hübenthal

[11] 3,776,263

[45] Dec. 4, 1973

[54] FUEL CUT-OFF LOCK

[76] Inventor: Aloys Hübenthal, Hirshbergstrasse 19, Munich, Germany

[22] Filed: May 15, 1972

[21] Appl. No.: 253,470

[30] Foreign Application Priority Data
May 19, 1971 Switzerland.....................7363/71

[52] U.S. Cl.................. 137/384.8, 70/242, 137/354, 251/274, 251/335 A, 251/360
[51] Int. Cl............................................ F16k 35/06
[58] Field of Search...................... 70/175, 242, 243, 70/244; 137/383, 384.2, 384.4, 384.6, 384.8, 354; 251/266, 267, 274, 335 A, 360

[56] References Cited
UNITED STATES PATENTS

| | | | |
|---|---|---|---|
| 3,116,752 | 1/1964 | Duncan......................... | 137/384.8 X |
| 1,374,621 | 4/1921 | Wicker ........................ | 137/384.8 |
| 2,688,462 | 9/1954 | Barbehenn..................... | 251/360 X |
| 1,742,319 | 1/1930 | Porter........................... | 251/360 |
| 1,107,800 | 8/1914 | Joynes............................ | 137/384.8 |

FOREIGN PATENTS OR APPLICATIONS

| | | | |
|---|---|---|---|
| 1,151,703 | 7/1963 | Germany........................ | 137/384.6 |
| 625,710 | 7/1949 | Great Britain..................... | 70/243 |

Primary Examiner—Alan Cohan
Assistant Examiner—Gerald A. Michalsky
Attorney—Ames E. Nilles

[57] ABSTRACT

Fuel flow through a pipeline is blocked and unblocked by means of a key operated rotary cylinder lock, a shut-off valve with a linearly reciprocable valve body, and a motion transmitting device which converts the rotary motion of the lock into translatory movement of the valve body. The motion transmitting device comprises a rotary, axially reciprocable element which has external screw threads in cooperative engagement with complementary internal screw threads of a surrounding housing; a reciprocable thrust element which connects the externally threaded element with the valve body; and a diaphragm seal between the reciprocable thrust element and the surrounding housing to prevent escape of fuel and fumes past the cylinder lock.

2 Claims, 3 Drawing Figures

FUEL CUT-OFF LOCK

BACKGROUND OF THE INVENTION

The invention relates to a fuel cut-off lock, primarily for motor vehicles, consisting of a lock casing that can be interposed in a fuel pipe by means of pipe connections, the casing containing a cylinder lock, the front end of which contains an opening for the insertion of a key, as well as a rotary plug that can be turned concentrically by the latter, whereby a shut-off member can be moved between a closed position, in which the fuel flow through the pipe connections is barred, and an open position in which that flow is permitted.

The closing cylinder of certain prior art fuel locks is combined with a fuel tap and arranged to turn axially in the tap housing. Being coupled to the plug of the tap, it also acts as the closing member. When this is in the closed position, a pin that can be moved outwards from the closing cylinder engages in an appropriate recess in the tap housing. The drawback of this existing fuel tap is that the wall of the housing surrounding the closing cylinder can be forced outwards, without great effort and in a short space of time, with a suitable tool such as, for example, a chisel, rendering the shut-off ineffective. Since the fuel tap, when fitted to a motor vehicle, must be accessible from the interior of that vehicle, there is a risk, even when the closing cylinder forms a very accurate turning fit in the tap housing, that fuel vapor forming in the latter may escape into the interior of the vehicle. This fuel tap therefore gives rise to considerable danger for the occupants.

Another prior art safety device which was intended to prevent the misappropriation or unauthorized use of a motor vehicle, consists of a flat valve inserted in the engine intake pipe, which can be locked in the closed position by a closing cylinder fitted with its axis parallel to that of the valve. Extending beyond this closing cylinder, at the end remote from the key-hole, is a portion of the closing member which is smaller in diameter than the said end and which engages with the valve spindle by means of teeth, so that the closing cylinder is prevented from turning in relation to the valve housing. This anti-rotation connection between the valve housing and the closing cylinder, however, is so designed that it is very easy to release, so that this safety device can likewise be put out of action quickly and with little effort.

Another prior art lockable fuel tap has its housing fitted with a cap that can be rotated coaxially with the plug of the tap, which cap contains an opening for the insertion of a safety key, the opening being of the same zig-zag shape as the key cross-section. The plug of the tap widens conically towards the rotary cap on the housing and that end of the plug which faces towards the key contains a slot into which the key can be pushed and prevented from turning in relation thereto. When this fuel tap is fitted to a motor vehicle, the rotary cap on the housing must be accessible from the vehicle interior. It is possible, however, for the rotary cap to be forced off without the expenditure of much time or effort, exposing the plug of the tap, which can then be withdrawn into the interior of the vehicle and reinserted after rotation to a position in which the flow of fuel is unimpeded. It is thus very easy to cut out the security function of this fuel tap as well; and again there is a danger, when the tap is fitted to a vehicle, that fuel vapor arising in the tap housing may escape into the vehicle interior.

SUMMARY OF THE INVENTION

The purpose of the present invention is to modify a fuel tap of the type described hereinbefore, with little constructional outlay, in such a way that the fuel shut-off cannot be eliminated, or can be eliminated only by the expenditure of much time and effort, and that the tap can be fitted in a motor vehicle without the slightest risk to its occupants. This is achieved by the use of a conventional cylinder lock with a cylinder plug that can be turned by a key in relation to the cylinder barrel and is accessible from the cylinder end remote from the key; by the provision of anti-rotation connections between the cylinder barrel and the lock casing and between the accessible part of the cylinder plug and a position control member adjacent to it, which can turn in a screw-thread in the casing; and by a valve thrust member positioned between the position control member and a valve seating through which passes the fuel flowing between the pipe connections, the valve thrust member being provided with a reciprocable seal for concentric movement in relation to the interior wall of the lock casing and serving to impart motion to a valve body constituting the shut-off member in relation to the valve seating.

Such a fuel lock possesses a considerable advantage by the mere fact that use can be made of a conventional, cheaply obtainable cylinder lock, the shut-off function of which can be rendered ineffective only, if at all, by the expenditure of much time and effort. The barrel of this cylinder lock is secured against turning in the lock casing, so that even if it be forced partly open, there is no possibility of rendering the shut-off function of the cylinder lock ineffective. In addition, instead of the plug of a tap being moved by the cylinder lock, as heretofore, a position control member carried by a screw-thread in a casing surrounding the cylinder lock moves a valve body in relation to a valve seat and may also hold it pressed to the seat in the closed position, as is the case with vertical cut-offs.

This form of construction prevents a flow of fuel from being obtained when the fuel lock is closed, or at least makes this far more difficult than with the prior art fuel locks, even if anybody should succeed in opening the lock casing or chiselling it apart at an accessible point. The valve thrust member, sealed and moving coaxially in relation to the interior wall of the surrounding casing, also prevents fuel vapor from escaping past the cylinder lock at the key end thereof, so that the fuel cut-off lock embodying the invention can unhesitatingly be fitted in passenger vehicles, all risk to their occupants being excluded as regards fuel vapor. By the joint action of the constructional measures described hereinbefore, the fuel cut-off lock embodying the invention will prevent, or at least considerably impede, the unauthorized extraction of fuel from tanks and, more especially, the unauthorized use or the theft of motor vehicles, and can be installed in motor vehicles without in the least endangering the occupants.

In this connection, it is particularly advantageous for the lock casing, between the position control member and the valve seat, to be divided, at right angles to the direction of movement of the valve body, by a diaphragm in which the valve thrust member is mounted, into two chambers separated by a gastight and liquid-tight seal. With such a diaphragm arrangement, not only can the valve body carry out its opening and closing movements, but the valve chamber of the fuel cut-off lock is hermetically sealed off from the cylinder lock and hence, in the case of a lock fitted in a vehicle, from the interior of the latter.

It is desirable for that face of the diaphragm which lies towards the key to be forced towards an inner annular retaining shoulder on the lock casing, so as to form a seal with the aid of an interposed packing ring, by the action of a thrust ring that can be removed from the casing only with a special tool, the thrust ring preferably being held immobile in the casing by molecular bonding such as cold welding or with a contact adhesive.

The lock casing should enclose the valve seat; and, to enable this to be renewed, the underside of the casing, remote from the key side, should contain an opening closed by a cap that can be removed only with a special tool. Making the valve seat renewable also enables the valve body to be readily renewed if it should show signs of undesirable wear.

It is also of advantage if the valve seat can form part of, or be carried by, a bored base of a pot-shaped member and if this member, with its bottom towards the valve body, can be inserted in the lock casing and made leakproof and can be placed in communication with one of the pipe connections through a radial bore in the skirt of the base, to allow fuel to pass. A pot-shaped member of this kind can be cheaply produced with such small tolerances that it is easy to exchange for another and yet can be fitted into the lock casing by simple means so as to provide a good seal.

In one recommended form of the fuel cut-off lock, a pipe adaptor, to join the pot-shaped member to the lock casing and prevent it from turning or moving longitudinally, can be inserted-by screwing, for instance-into one pipe connection and into a radial bore in the skirt of the pot-shaped member. This pipe adaptor, which, once inserted, can be secured to the pipe connection and/or the pot-shaped member by molecular bonding such as cold welding or with a contact adhesive, will prevent the unauthorized removal of the pot-shaped member — the renewal of which by authorized staff is in itself a simple matter — for the purpose of rendering the shut-off function of the fuel cut-off lock ineffective, even if unauthorized persons should succeed in removing or destroying the cap by which the bottom of the casing is closed and replacing it with another cap.

It is desirable that the mouth of the pot-shaped member, which faces towards the cap by which the bottom of the lock casing is closed, should have provision for leakproof closure in the form of a pot cover, which likewise can be secured to the pot itself by molecular bonding such as cold welding or with a contact adhesive or can be so designed that it can be removed from the pot only with a special tool.

BRIEF DESCRIPTION OF THE DRAWINGS

Practical examples of the invention, with further details of construction and of the advantages resulting therefrom, are described hereinbelow in conjunction with the accompanying drawings, in which.

DETAILED DESCRIPTION

Figure 1:
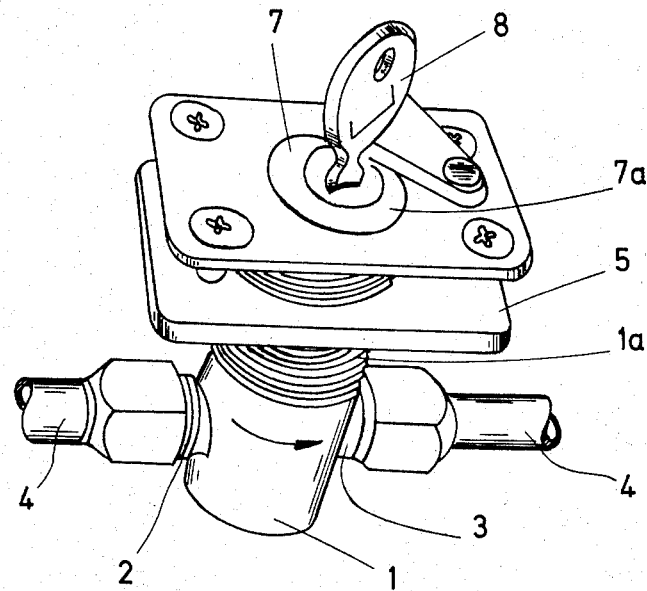
FIG. 1 is a perspective view of a fuel lock embodying the invention.

Referring to FIG. 1, a fuel lock has a cylindrical lock casing 1 with pipe connections 2 and 3 by means of which it can be interposed in a fuel pipe 4. Above the pipe connections 2 and 3 the lock casing 1 carries an external screw thread 1a, for a screw-on flange 5 by means of which it can be fixed to a support such as a floor-plate 6 (FIG. 2), in a vehicle. The lock casing 1 contains a concentric closing cylinder 7, the front end of which contains an opening for the insertion of a safety key 8, and which has a closing member 7a, rotated by means of the key. By means which will be described later, this closing member moves a shut-off member in the lock casing 1 between a closed position, in which the flow of fuel through the pipe connections 2 and 3 is barred, and an open position in which that flow is permitted.

Figure 2:
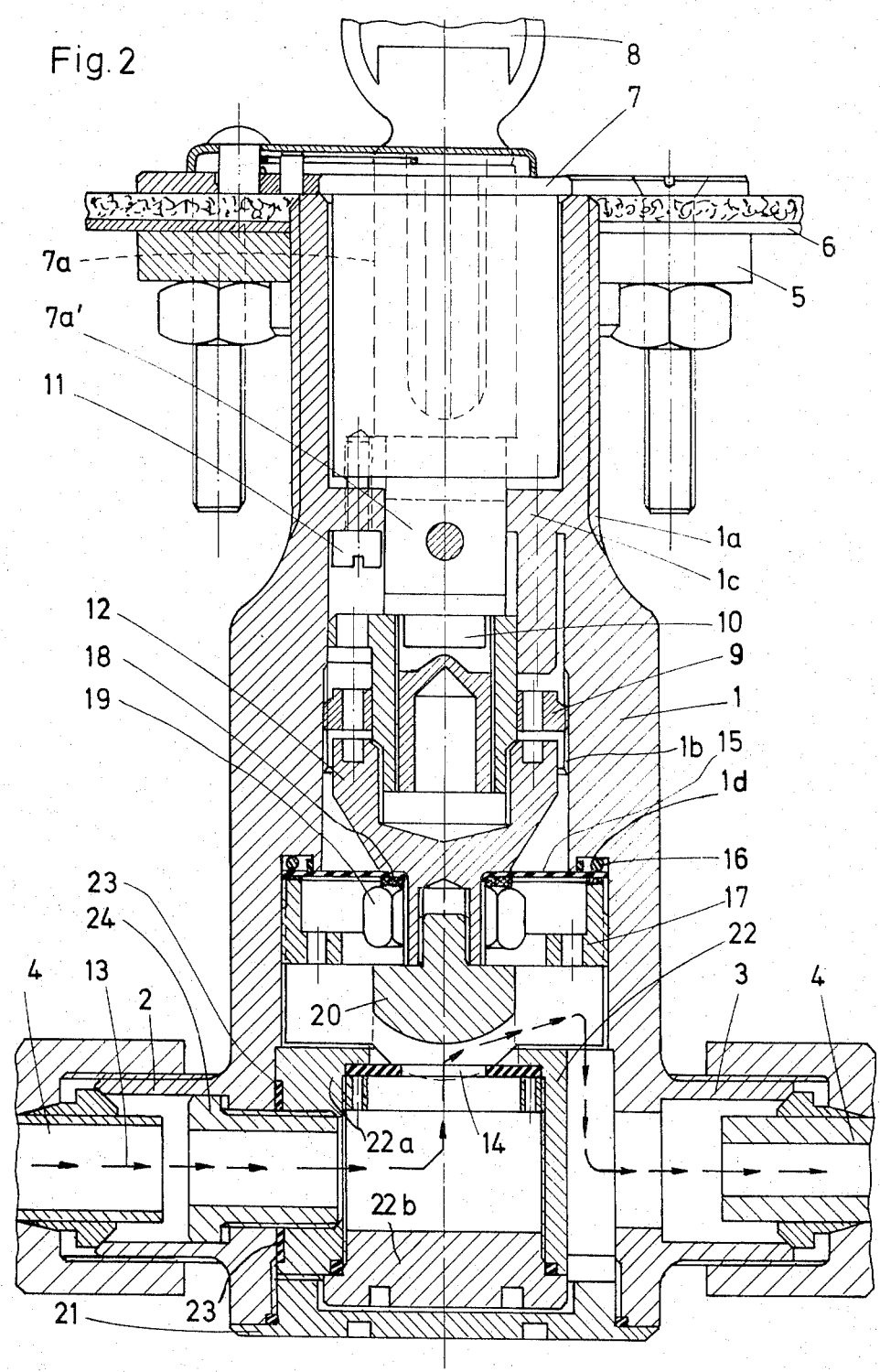
FIG. 2 is an axial section of the fuel lock shown in FIG. 1.

In FIG. 2, the closing member 7a of the closing cylinder 7 is mounted coaxially within the latter, with freedom to turn, and is accessible from that end of the cylinder which faces away from the key 8, beyond which end it protrudes by a portion smaller in diameter 7a'.

Immediately beyond the portion 7a', of the closing member is a position control member 9 mounted concentrically to the cylinder body and in cooperative engagement with an inside thread 1b in the lock casing 1. The position control member 9 is secured by an axial-release coupling 10 from turning in relation to the portion 7a' of the closing member. The lock casing 1 incorporates a partition 1c, which separates the body of the closing cylinder 7 from the position control member 9 but is bored to enable the accessible portion 7a' of the closing member to pass through and to turn. In addition to the bore through which the portion 7a' passes, the partition 1c contains at least one hole for a cap screw 11 which is threaded into a tapped hole in the adjacent end of the cylinder body by axial movement away from the position control member. If desired, this screw 11 once screwed home may be held against turning by being cold-welded or secured with contact adhesive to the partition 1c. The screw 11 serves to secure the closing cylinder 7 against rotary or longitudinal movement in relation to the lock casing 1.

Turning of the key 8 is transmitted to the position control member 9 through the closing members 7a, 7a' and the clutch 10 and the resulting turning of the external threads on member 9 within the complementary internal threads of casing 1 causes concentric translational movement of member 9 which, in turn, causes the member 9 to bear against a valve thrust member 12 positioned between the position control member 9 and a valve seat 14. The seat 14 affords a passage for fuel flow between the pipe connections 2 and 3, and a leak-proof seal is provided between the valve thrust member 12 and the interior wall of the lock casing 1, the member 12 being slideable concentrically within the latter.

In the embodiment of the invention shown in FIG. 2, the seal between the valve thrust member 12 and the interior of the casing 1 is afforded by a diaphragm 15, by which the casing is divided into a wet compartment terminating at one end of the casing and having the fuel inlet passage 2 and outlet passage 3, and into a dry compartment terminating at the other end of the casing 1. That face of the diaphragm 15 which lies towards the key is forced towards an inner ring-retaining shoulder 1d, on the lock casing 1, so as to form a seal with the aid of an interposed packing ring 16, by the action of a thrust ring 17, which can be removed from the casing 1 only by the use of a special tool and may be held against turning in relation to the casing, if desired, by molecular bonding such as cold welding or with a contact adhesive.

The diaphragm 15 also acts as a mounting for the valve thrust member 12, which passes centrally through it and is sealed in relation to it by means of a flat packing ring 18, tightened by a nut 19. The position control member 9 is rotatable independently of the thrust member 12 and cooperable therewith so that back and forth movement of the position control member lengthwise of the casing 1 in response to rotation thereof in opposite directions will result in back and forth movement of the thrust member 12 into and out of a fuel flow blocking position. Axial movement of the valve thrust member 12 in relation to the lock casing 1 is made possible by the elasticity of the diaphragm 15. Connected to the thrust member 12 is a valve body 20, which constitutes the shut-off member. The valve body 20 can be pressed upon the valve seat 14 by the screw motion of the position control member 9 acting on the valve thrust member 12 so as to block fuel flow through the pipe line 14 and the valve body can be lifted off the seat 14 by the restoring force of the diaphragm 15, to unblock the flow path.

The lock casing 1 encloses the valve seat 14 and, to enable this seat to be renewed, the underside of the casing, remote from the key side, contains an opening closed by a cap 21, which can be removed only with a special tool. This cap 21 likewise, once closed, can be held in this position on the casing 1 by molecular bonding such as cold welding or with a contact adhesive.

In the embodiment shown in FIG. 2, the valve seat 14 consists of a flat ring, fitted in an inverted pot memer 22 and supported by a bored base 22a. The inverted pot member 22, along with its base 22a faces towards the valve body 20, and can be inserted in the lock casing 1 and made leakproof therein with the aid of sealing rings 23, for example, and can be placed in communication with the pipe connection 2 through a radial bore in the skirt of the base, to allow fuel to pass. In this position, the pot member 22 can be connected to the casing 1, without being able to turn or slide, by means of a pipe adaptor 24, which can be pushed or screwed into the pipe connection 2 and the skirt bore in the base to form a leakproof connection and may likewise, if desired, be secured by molecular bonding against unauthorized removal.

The opening in the pot member 22 facing towards the cap 21 on the lock casing 1 is provided with a leakproof closure by the pot cover 22b, which again can be removed from the member 22 only with a special tool and may also be secured against unauthorized removal by molecular bonding.

Figure 3:
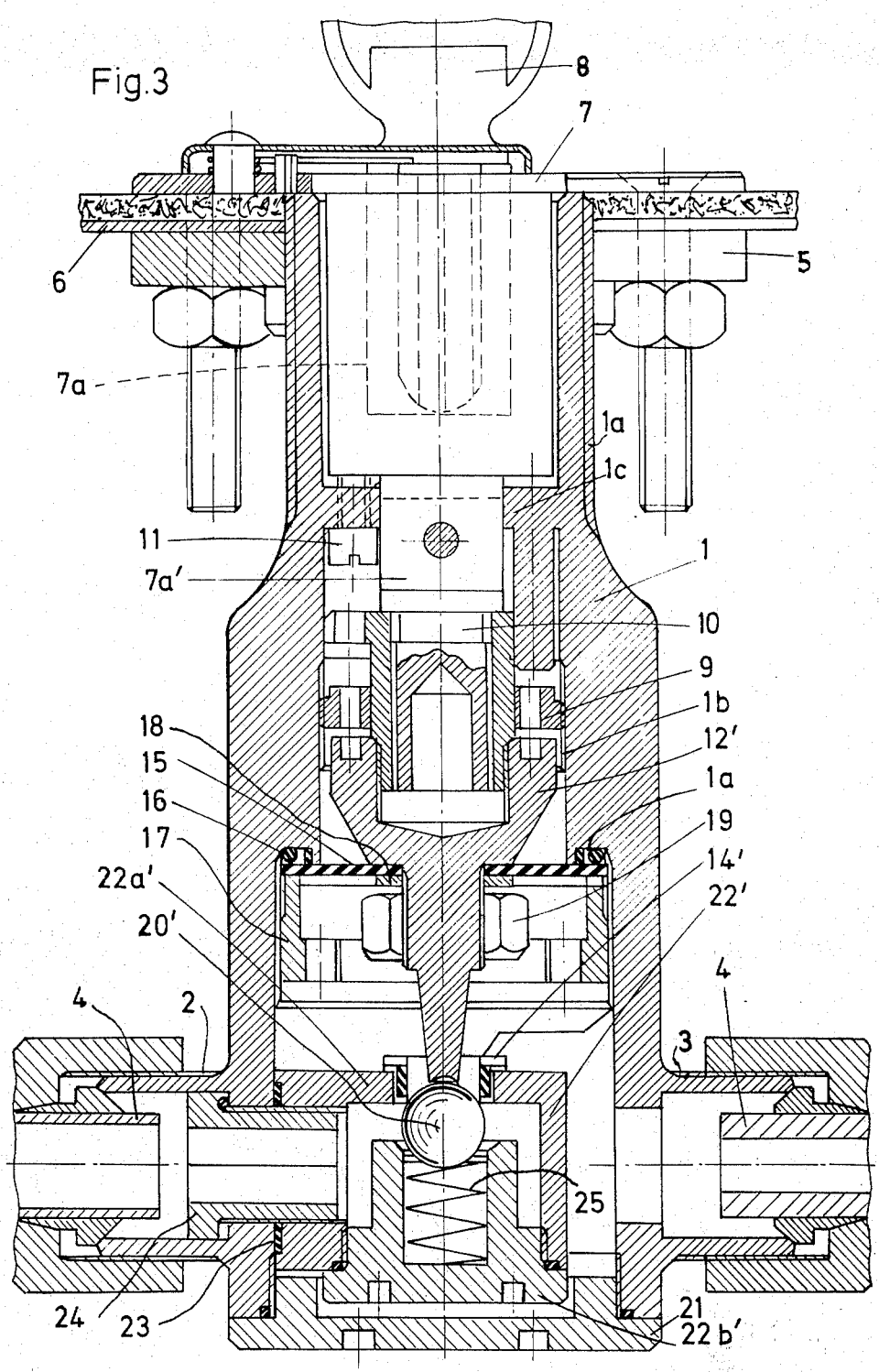
FIG. 3 is a view similar to FIG. 2, but showing a somewhat modified construction.

The valve body 20 of the fuel lock shown in FIG. 2 can be pressed by the valve thrust member 12 axially away from the key end of the casing 1 and against the valve seal 14, whereas the fuel lock shown in FIG. 3 has a valve body 20', which can be pressed by the action of an elastic body such as, for example, a compression spring 25, axially toward the key end of the casing and against an appropriately shaped valve seat 14', when in the closed position, and can be moved off the valve seat 14' by a valve thrust member 12', which passes through the seat, to unblock the fuel path. The valve seat 14' is again equipped with an inverted pot member 22', and formed or carried by the base 22a' thereof. The member 22' has a pot cover 22b', the inner end of which is provided with guide faces for the valve body 20'. The other parts of the fuel lock in FIG. 3 differ not at all or only in minor respects from the fuel lock of FIG. 2 and are therefore denoted by the same reference numerals as in FIG. 2.

The invention is not limited to the embodiments here illustrated. Thus, for instance, it would be possible to design the valve body and its operating and guiding members in such a way that the fuel lock would act not, as in the drawings, as a vertical-acting shut-off, but as a side-to-side shut-off; and although the diaphragm 15 provides an ideal gas-tight and liquid-tight partitioning of the lock casing 1, such partioning might also be achieved by providing the valve thrust member 12 or 12' with a sliding seal against the interior wall of the casing, in the form of suitable packings such as, for example, packing rings.

1. A fuel cut-off lock comprising an elongated hollow casing; a flexible diaphragm dividing said casing into a wet compartment terminating at one end of said casing and having fuel inlet and outlet passages, and into a dry compartment terminating at the other end of said casing; a pot member inserted through said one end of said casing into said wet compartment in an inverted position and having an axial aperture in its bottom and a radial aperture in its skirt portion; a pipe adaptor extending through said fuel inlet passage and said raidal skirt aperture so as to secure said pot member against turning and axial displacement within said wet compartment; a cap member secured to and closing said one end of said casing; valve means within said wet compartment for blocking and unblocking fuel flow therethrough from said inlet to said oulet passage, said valve means comprising a valve seat surrounding said axial aperture of said pot member and a valve body reciprocable lengthwise of said casing into and out of sealing engagement said valve seat; a thrust member secured to said diaphragm in cooperable relation with said valve body so that said fuel flow through said wet compartment will be blocked and unblocked by deflection of said diaphragm in opposite directions; a position control member within said dry compartment having external screw threads in cooperative engagement with internal screw threads of a surrounding casing portion; said position control member being rotatable independently of said thrust member and cooperable therewith so that back and forth movement of said position control member lengthwise of said casing in response to rotation thereof in opposite directions will result in back and forth movement of said thrust member into and out of a fuel flow blocking position; and key operated rotary lock means in said dry compartment connected in torque transmitting relation with said position control member, whereby said thrust member may be releasably locked in said fuel flow blocking position.

2. A fuel cut-off lock as set forth in claim 1 and further comprising an end cover secured to the open side of said inverted pot member within said wet compartment independently of said cap member.

* * * * *